(12) United States Patent
Bhandari et al.

(10) Patent No.: US 9,772,928 B2
(45) Date of Patent: Sep. 26, 2017

(54) DISTRIBUTED KERNEL THREAD LIST PROCESSING FOR KERNEL PATCHING

(71) Applicant: Hewlett Packard Enterprise Development LP, Houston, TX (US)

(72) Inventors: Ashank Bhandari, Bangalore (IN); Abhay Padlia, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/109,811

(22) PCT Filed: Jan. 2, 2014

(86) PCT No.: PCT/US2014/010030
§ 371 (c)(1),
(2) Date: Jul. 5, 2016

(87) PCT Pub. No.: WO2015/102631
PCT Pub. Date: Jul. 9, 2015

(65) Prior Publication Data
US 2016/0328310 A1    Nov. 10, 2016

(51) Int. Cl.
*G06F 9/44* (2006.01)
*G06F 9/45* (2006.01)
(Continued)

(52) U.S. Cl.
CPC .............. *G06F 11/366* (2013.01); *G06F 8/67* (2013.01); *G06F 8/68* (2013.01)

(58) Field of Classification Search
CPC ... G06F 9/328; G06F 8/68; G06F 8/65; G06F 9/4812; G06F 21/126; G06F 21/57; G06F 11/3612
See application file for complete search history.

(56) References Cited

U.S. PATENT DOCUMENTS 7,076,647 B2   7/2006 Roth et al.
7,818,736 B2   10/2010 Appavoo et al.
(Continued)

OTHER PUBLICATIONS

Andrew Baumann et al.; Improving Operating System Availability With Dynamic Update ; 2004 CS.bu.edu; 7 pages; <http://www.cs.bu.edu/fac/jappavoo/Resources/Papers/10.1.1.130.8088.pdf>.*
(Continued)

*Primary Examiner* — Thuy Dao
*Assistant Examiner* — Cuong V Luu
(74) *Attorney, Agent, or Firm* — Hewlett Packard Enterprise Patent Department

(57) ABSTRACT

In one example implementation, a system for patching a kernel can comprise a plurality of processor resources, a distribution engine to divide a kernel thread list into a number of portions, and a handler engine to manage processing a portion of the kernel thread list to determine when a target function is associated with the portion of the kernel thread list. In another example implementation, a method for patching a kernel can comprise receiving an online patch request, sending an interrupt to a plurality of processor resources, distributing a kernel thread list to the plurality of processor resources, and parsing a portion of the kernel thread list on one of the plurality of processor resources to determine when the portion is associated with a target function.

10 Claims, 5 Drawing Sheets

(51) Int. Cl.
*G06F 11/36* (2006.01)
*G06F 9/445* (2006.01)

(56) References Cited

U.S. PATENT DOCUMENTS

| | | | | |
|---|---|---|---|---|
| 8,127,280 B2* | 2/2012 | Thomas | ............... | G06F 8/4442 717/136 |
| 8,499,289 B2 | 7/2013 | Dai et al. | | |
| 8,607,208 B1* | 12/2013 | Arnold | ................ | G06F 8/67 717/129 |
| 2002/0040470 A1* | 4/2002 | Guthrie | ................ | G06F 8/4442 717/126 |
| 2002/0104077 A1* | 8/2002 | Charnell | ............... | G06F 8/4442 717/162 |
| 2002/0108106 A1* | 8/2002 | Kramskoy | ............ | G06F 8/4442 717/148 |
| 2002/0108107 A1* | 8/2002 | Darnell | ................. | G06F 8/4442 717/153 |
| 2002/0112227 A1* | 8/2002 | Kramskoy | ............ | G06F 8/4442 717/148 |
| 2004/0107416 A1 | 6/2004 | Buban et al. | | |
| 2004/0210653 A1 | 10/2004 | Kanoor et al. | | |
| 2006/0048134 A1 | 3/2006 | Napier et al. | | |
| 2010/0205587 A1* | 8/2010 | Dai | ........................... | G06F 8/67 717/140 |
| 2013/0219147 A1 | 8/2013 | Qiang et al. | | |

OTHER PUBLICATIONS

Alistair C. Veitch et al.; Kea A Dynamically Extensible and Configurable Operating System Kernel; 1996 IEEE; pp. 236-242; <http://ieeexplore.ieee.org/stamp/stamp.jsp?arnumber=509367>.*

Terrence Mitchem et al.; Using Kernel Hypervisors to Secure Applications; 1997 IEEE: pp. 175-181; <http://ieeexplore.ieee.org/stamp/stamp.jsp?arnumber=646188>.*

Kazuhiko Kashiwagi et al.; Design and Implement at ion of Dynamically Reconstructing System Software; 1996 IEEE; pp. 278-287; <http://ieeexplore.ieee.org/stamp/stamp.jsp?arnumber=566762>.*

Don Stewart et al.; Dynamic Applications From the Ground Up; 2005 ACM; pp. 27-38; <http://dl.acm.org/citation.cfm?id=1088352&CFID=766478215&CFTOKEN=91576909>.*

Yueh-Feng Lee et al.; Hotswapping Linux kernel modules; 2006 Elsevier; pp. 163-175; <http://www.sciencedirect.com/science/article/pii/S0164121205001068>.*

Arnold, Jeff and Kaashoek, M. Frans. Ksplice: automatic rebootless kernel updates. EuroSys '09 Proceedings of the 4th ACM European conference on Computer systems pp. 187-198 ACM New York, NY, USA © 2009.

Baumann, et al. Providing dynamic update in an operating system. ATEC '05 Proceedings of the annual conference on USENIX Annual Technical Conference, pp. 32 32, 2005 usenix.org.

Gupta, Deepak. On-line software version change. Department of Computer Science & Engineering, Indian Institute of Technology, Kanpur Nov. 1994.

Liu, X-J et al, SPOTOS: A Safe Point Detector for Online Patching Commodity OS, 2010 Ninth International Conference on Grid and Cloud Computing, Oct. 19, 2010, 6 pgs.

Makris, et al, On-The-Fly Kernel Updates for High-Performance Computing Clusters, Jan. 19, 2006, 8 pgs.

Neamtiu, et al. Practical dynamic software updating for C. PLDI '06: Proceedings of the 2006 ACM SIGPLAN conference on Programming language design and implementation Jun. 2006.

Soules, et al. System support for online reconfiguration. 2003 USENIX.

Tamches, et al. Using Dynamic Kernel instrumentation for Kernel and Application Tuning. International Journal of High Performance Computing Applications archive vol. 13 Issue 3 Aug. 1999 pp. 263 276.

Baumann, et al. Providing dynamic update in an operating system. ATEC '05 Proceedings of the annual conference on USENIX Annual Technical Conference, pp. 32-32, 2005 usenix.org.

Tamches, et al. Using Dynamic Kernel Instrumentation for Kernel and Application Tuning. International Journal of High Performance Computing Applications archive vol. 13 Issue 3 Aug. 1999 pp. 263-276.

* cited by examiner

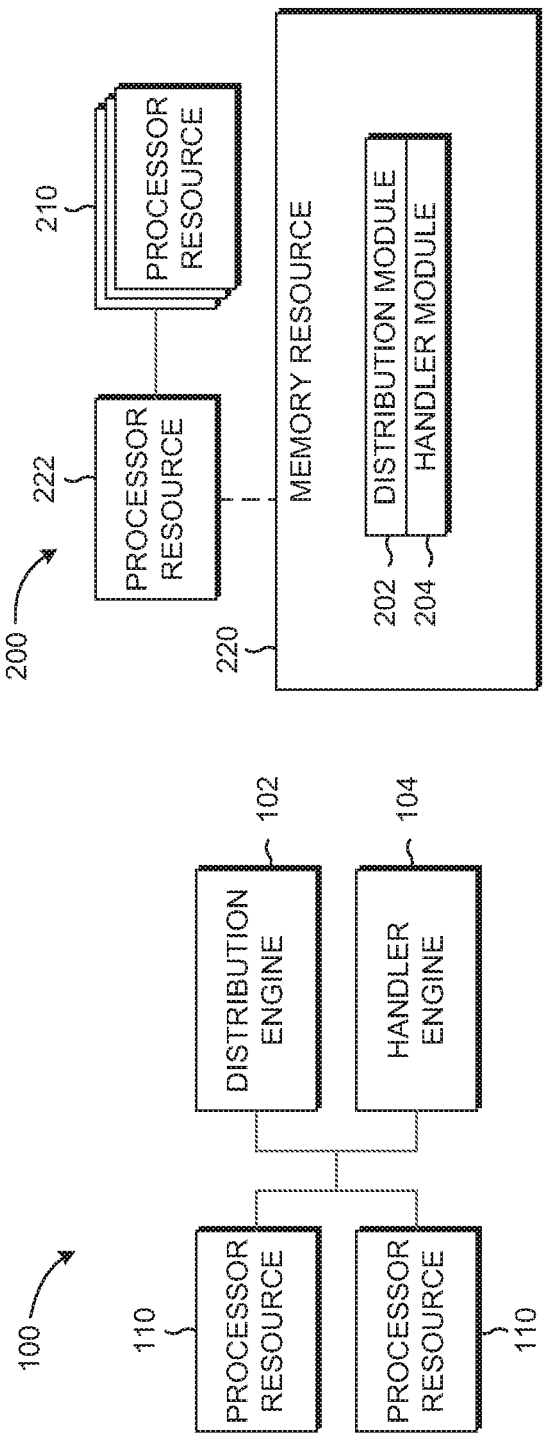

DISTRIBUTED KERNEL THREAD LIST PROCESSING FOR KERNEL PATCHING

BACKGROUND

Business applications commonly utilize systems and software to provide a service. Often, systems and software are updated to improve reliability and functionality of the service. These updates can fix or otherwise eliminate bugs (an error, flaw, fault, or other unintended result) in the system and/or software.

BRIEF DESCRIPTION OF THE DRAWINGS

FIGS. 1 and 2 are block diagrams depicting example systems for patching a kernel.

DETAILED DESCRIPTION

Figure 3:
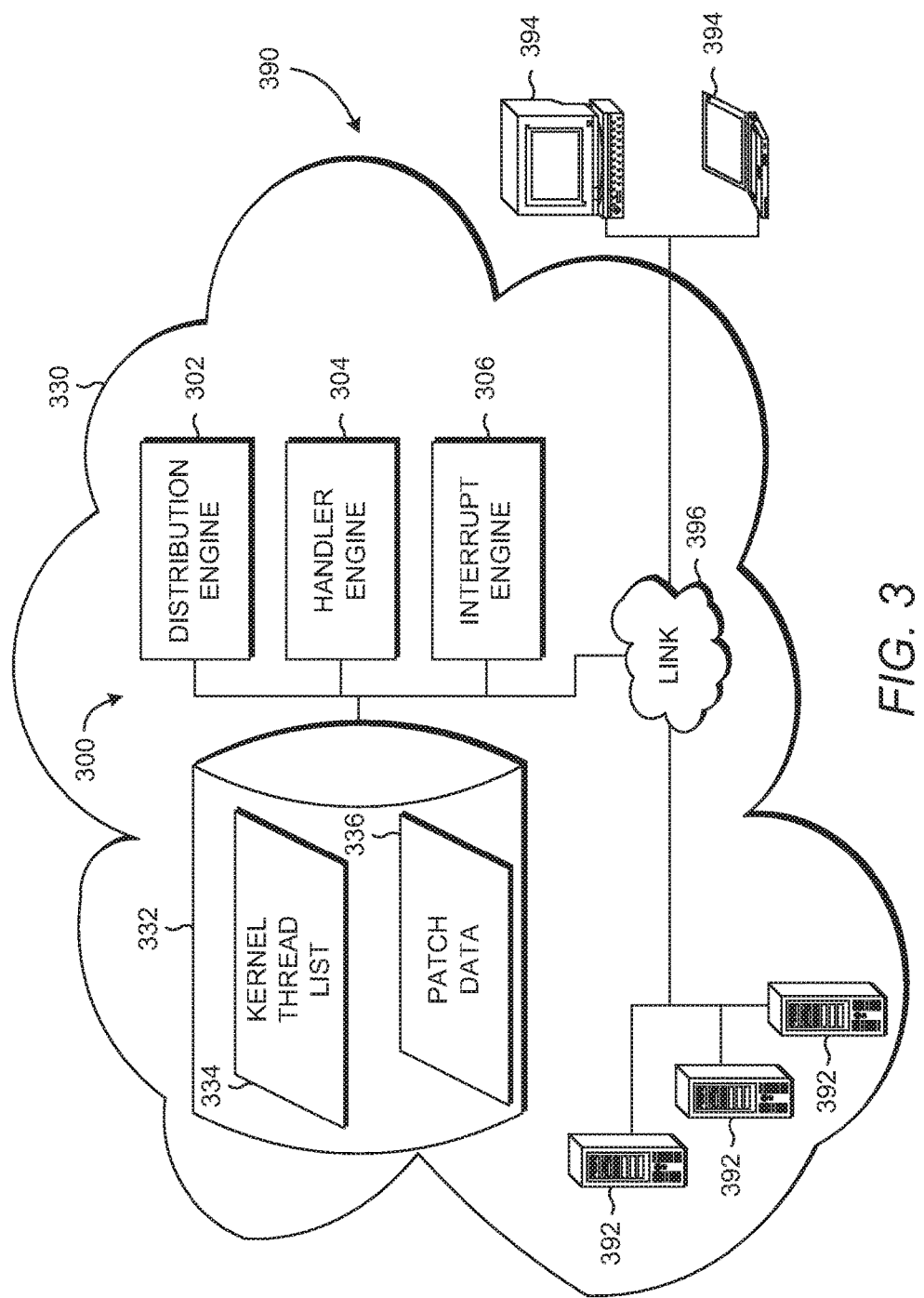
FIG. 3 depicts example environments in which various example systems for patching a kernel can be implemented.

In the following description and figures, some example implementations of systems and/or methods for patching a kernel are described. A kernel is a computer program that acts as an intermediary between application software and the hardware of the computer. For example, a kernel can manage input/output ("IO") requests from software for data processing on a central processing unit ("CPU"). A kernel, just as other software, can be updated by applying a patch to the computer program instructions. As used herein, a patch is a second set of instructions designed to replace a first set of instructions.

A patch can replace an entire instruction block. Alternatively, a patch can replace the first few lines of an instruction block with a jump instruction to a separate instruction block. For example, the first few lines of a to-be-patched function can be replaced with a long jump to a memory address where the replacement instruction block is located. Patch updates commonly request a reboot of the system to apply a patch. However, mission critical applications commonly expect the system to provide uninterrupted service. As a result, administrators can avoid updating a system to avoid downtime of mission critical application. Thus, the outdated system may continue to be affected by the bugs until a time to reboot is determined and those effects could be avoided if the system was updated in a timely fashion.

A patch can be applied to a kernel without a reboot using a kernel dynamic patching technique. Before applying a patch, a safe point can be detected. For example, a safe point to apply a patch would be when the to-be-patched instructions are not in use. The memory allocated to the kernel can be checked to verify whether a set of instructions is in use by the kernel. For example, an interrupt can be sent to halt operation on the system, and the kernel thread list in memory can be traversed to determine if an instruction pointer to the to-be-patched instructions exists. Commonly, the system can be halted and one core of a processor can be used to traverse the kernel thread list. In a multi-core system capable of executing many instructions in parallel, the traversal of the kernel thread list can take a relatively long time compared to the rate of speed at which a core can operate. For example, the online kernel patching can take longer than the few milliseconds expected on a multi-core system with a relatively heavy workload. During that time, the other cores run idle loops and waste valuable processing cycles.

Various examples described below relate to patching a kernel based on distributing the kernel thread list to a plurality of processor resources. By distributing the kernel thread list, the processing time of the safe point detection stage of dynamic kernel patching can be reduced. Implementing the systems and methods described herein can provide an increase in the efficiency of traversing the kernel thread list as cores of a system increase. More specifically, the efficiency of the safe state determination can increase by a multiple of the processor resources allocated to the safe state determination.

FIGS. 1 and 2 are block diagrams depicting example systems for patching a kernel. Referring to FIG. 1, an example kernel patching system 100 generally comprises a plurality of processor resources 110, a distribution engine 102, and a handler engine 104. Each of the plurality of processor resources 110 represent a computational unit to carry out instructions, such as perform arithmetical operations, logical operations, and IO operations. Common references to a processor resource include "CPU," "processor," and "core," The plurality of processor resources 110 can be integrated on a single chip or distributed across multiple chips.

The distribution engine 102 represents any combination of circuitry and executable instructions configured to divide a kernel thread list into a number of portions. A kernel thread list is a structure of data containing references to the instructions in memory used by a thread of the kernel. For example, the kernel thread list can be a list of active functions of the system executing kernel operations. The kernel thread list can be represented as nodes and a portion of the kernel thread list can include a node. Each node can be a kernel thread structure that includes a link to the next node, such as a linked list data structure. The number of nodes in a portion can be equal to that of another portion or vary.

The distribution engine 102 can distribute the plurality of portions to a plurality of processor resources 110. The portions can be distributed among the plurality of processor resources 110 based on number of processor resources 110 and/or the size of the kernel thread list. For example, the number of portions can be he same number as the plurality of processor resources 110 and the portions can be divided equally among the plurality of processor resources 110.

The portion can be a consecutive set of nodes or a discontinuous set of nodes linked together, such as by reference to a node other than the next consecutive node. The distribution engine 102 can determine a number of nodes to skip, or a skip factor as discussed herein. The skip factor can be used to determine a following node of the portion, such as a link to a non-consecutive node. For example, a next node of the portion can be determined by jumping a number of nodes equal to a skip factor from the last parsed node.

The distribution engine 102 can provide a reference to a portion of the kernel thread list. The reference can be direct to memory, via data structure, or other form capable of retrieval of the portion. For example, the distribution engine 102 can provide a reference to a first node of the portion or a reference to the memory address where the portion is stored. The first node can be a starting point. The distribution engine 102 can determine a starting point for each of the plurality of portions. The distribution engine 102 can determine a skip factor and a starting point based on the plurality of processor resources 110.

The distribution engine 102 can send instructions to the plurality of processor resources 110 to determine a list of nodes of the portion based on the number of plurality of processor resources 110. In this way, the determination of portions can be distributed to the plurality of processor resources 110 and operations for making the determinations can be executed concurrently. The nodes associated with a portion of the kernel thread list can be determined using a combination of the number of processor resources and the skip factor. For example in a dual-core processor, a kernel thread list can be divided into portions associated with cores in a pattern where each portion includes the number of nodes equal to the skip factor. More specifically, if the skip factor is 6, the first core can receive a first portion of nodes 1-6 and a second portion of nodes 13-18 and the second core can receive a first portion of nodes 7-12 and a second portion of nodes 19-24.

The plurality of processor resources 110 can process the plurality of portions for a target function, as discussed further in the description of the handler engine 104. The target function is a set of instructions, or an instruction block, to be updated by the patch. The distribution engine 102 can set a flag to trigger processing on a processor resource 110. The distribution engine 102 can send a flag to signal the plurality of processor resources 110 to begin parsing the plurality of portions, and the plurality of portions can be processed in parallel. The processing can be accomplished via the handler engine 104. For example, the distribution engine 102 can set a flag to signal the handler engine 104 to process the portion of the kernel thread list to find a target function.

The handler engine 104 represents any combination of circuitry and executable instructions configured to manage processing a portion of the kernel thread list. The processing can operate on the kernel thread list to assist in the determination as to whether it is a safe time to patch the kernel. For example, the handler engine 104 can process a portion to determine when a target function is associated with the portion of the kernel thread list.

The handler engine 104 can compare a node of the kernel thread list to a target function. For example, the node can contain an attribute that represents a reference to a memory address associated with the kernel thread list and that attribute can be compared to the pointer to the target function to determine whether the pointer references the same memory address as contained in the node. The handler engine 104 can receive data from memory and/or a data structure to compare the data to the kernel thread list. For example, the handler engine 104 can determine when an instruction pointer of the target function is in the portion of the kernel thread list. The handler engine 104 can process the number of portions in parallel to determine when the kernel thread list is in a potentially safe state, such as when the kernel thread list is free of the target function. The results of processing each portion can be returned and combined to determine if the target function is in the kernel thread list. For example, the handler engine 104 can be distributed across plurality of processor resources 110 and utilize the processing result of each portion in determining whether the kernel thread list is potentially safe for patching.

The handler engine 104 can process the portion of the kernel thread list at a starting point. For example, the handler engine 104 can receive a reference to a node designated as an initial starting point from the distribution engine 102 where the initial starting point is the first node apportioned to a processor resource for processing. The starting point can be determined based on the first node of the kernel threat list, the number of processor resources 110 available to process the kernel thread list, and/or the skip factor. For example, the handler engine 104 can determine a next starting point for a second portion of the kernel thread list based on a skip factor and a number of processor resources.

The handler engine 104 can process a number of nodes of the kernel thread list from the starting point. For example, a number of nodes can be designated as a set portion size for each processor resource 110 to process. The number of nodes can be based on the skip factor. For example, the skip factor can be used to determine the portion size.

The handler engine 104 can skip the number of the plurality of processor resources 110 over the kernel thread list based on the skip factor and a last processed node. For example, if there are four processor resources 110 and the skip factor is 64, a first processor resource 110 can process the portion of the kernel thread list starting at the first node, process a number of nodes of the kernel thread list equal to the skip factor, and if the process flag is still set, the first processor resource 110 can skip to the 257th node (the number of processor resources 110 times the skip factor) of the kernel thread list. The handler engine 104 can loop retrieving nodes and/or portions of the kernel thread list based on a flag, such as a process flag. Each loop can entail retrieving the next node based on the number of processor resources 110, the skip factor, and the last process node. The processing loop can continue until a termination event. For example, the processing loop can continue until there are no more nodes of the kernel thread list or the process flag is no longer set.

The handler engine 104 can return the results to the distribution engine 102. The handler engine 104 can return results to the distribution engine 102 as a node is processed, as a portion is processed, and/or once the end of the kernel thread list is reached. The distribution engine 102 can combine the results to determine if the target function is in the kernel thread list. For example, the processing function can return a false value when a reference to the target function is not found and a value of true when a reference to the target function is found, where the disjunctive combination (the logical operation OR) of the processing results would determine that the target function is referenced in the kernel thread list.

The handler engine 104 can set a flag once a reference to the target function is found. For example, the handler engine 104 can set a stop flag to signal the plurality of processor resources 110 that a reference to the target function is found. Instead of fetching a new portion of the kernel thread list, a process resource can terminate processing the kernel thread list, return to executing the prior operation, and wait a time before trying to parse the kernel thread list again. The plurality of processor resources 110 can resume execution of previous operations for a designated time period. For example, the time period can be designated by the system, the patch, and/or the user. The operations can continue until the target function is no longer referenced in the kernel thread list or on a scheduled basis.

FIG. 2 depicts the system 200 for patching a kernel can be implemented on a memory resource 220 operatively coupled to a processor resource 222. The processor resource 222 can be one of or separate from the plurality of processor resources 210. The plurality of processor resources 210 can be the same as the plurality of processor resources 110.

Referring to FIG. 2, the memory resource 220 can contain a set of instructions that can be executable by the processor resource 222. The set of instructions can implement the system 200 when executed by the processor resource 222. The set of instructions stored on the memory resource 220 can be represented as a distribution module 202 and a handler module 204. The processor resource 222 can carry out the set of instructions to execute the distribution module 202, the handler module 204, and/or any appropriate operations among or associated with the modules of the system 200. For example, the processor resource 222 can carry out a set of instructions to send an interrupt to halt an operation, divide a kernel thread list into a plurality of portions, distribute the plurality of portions to a plurality of processor resources to process the plurality of portions for a target function, and combine a set of results to determine when the target function is in the kernel thread list. The distribution module 202 and the handler module 204 represent program instructions that when executed function as the distribution engine 102 and the handler engine 104 of FIG. 1, respectively.

The processor resource 222 can be one or multiple CPUs capabie of retrieving instructions from the memory resource 220 and executing those instructions. The processor resource 222 can process the instructions serially, concurrently, or in partial concurrence, unless described otherwise herein.

The memory resource 220 represents a medium to store data utilized by the system 200. The medium can be any non-transitory medium or combination of non-transitory mediums able to electronically store data and/or capable of storing the modules of the system 200 and/or data used by the system 200. For example, the medium can be a storage medium, which is distinct from a transmission medium, such as a signal. The medium can be machine readable, such as computer readable.

In the discussion herein, the engines 102 and 104 of FIG. 1 and the modules 202 and 204 of FIG. 2 have been described as a combination of circuitry and executable instructions. Such components can be implemented in a number of fashions. Looking at FIG. 2, the executable instructions can be processor executable instructions, such as program instructions, stored on the memory resource 220, which is a tangible, non-transitory computer readable storage medium, and the circuitry can be electronic circuitry, such as processor resource 222, for executing those instructions. The processor resource 222, for example, can include one or multiple processors. Such multiple processors can be integrated in a single device or distributed across devices. The memory resource 220 can be said to store program instructions that when executed by the processor resource 222 implements the system 200 in FIG. 2. The memory resource 220 can be integrated in the same device as the processor resource 222 or it can be separate but accessible to that device and the processor resource 222. The memory resource 220 can be distributed across devices.

In one example, the executable instructions can be part of an installation package that when installed can be executed by processor resource 222 to implement the system 200. In that example, the memory resource 220 can be a portable medium such as a CD, a DVD, a flash drive, or memory maintained by a computer device, such as server device 392 of FIG. 3, from which the installation package can be downloaded and installed. In another example, the executable instructions can be part of an application or applications already installed. Here, the memory resource 220 can include integrated memory such as a hard drive, solid state drive, or the like FIG. 3 depicts example environments in which various example systems 300 for patching a kern& can be implemented. The example environment 390 is shown to include an example system 300 for patching a kernel. The system 300 (described herein with respect to FIGS. 1 and 2) can represent generally any combination of circuitry and executable instructions configured to patch a kernel. The system 300 can include a distribution engine 302 and a handler engine 304 that are the same as the distribution engine 102 and the handler engine 104 of FIG. 1, respectively, and, for brevity, the associated descriptions are not repeated.

The example system 300 of FIG. 3 also includes an interrupt engine 306. The interrupt engine 306 represents any combination of circuitry and executable instructions configured to send an interrupt to a plurality of processor resources when a set of patch data is received. The interrupt engine 306 can send the interrupt to halt an operation on a processor resource. In particular, an interrupt can be sent to the plurality of processor resources to stop operation of instructions and, thereby, provide a time when the kernel thread list is not changing. The distribution engine 302 can halt operations of the plurality of processor resources via the interrupt engine 306. The distribution engine 302 can send an interrupt to cause the operations of the plurality of processor resources to pause. The interrupt sent by the interrupt engine 306 can be an interrupt of a degree to ensure the plurality of processor resources halt operations and the kernel thread list does not change during the safe state detection processing. The degree and type of interrupt can be selected based on the type of operations being performed. For example, the interrupt having a first level of priority can be sent when the plurality of processor resources are executing functions having a second level of priority, where the first level of priority is higher than the second level of priority. The interrupt engine 306 can concurrently send the interrupt to all the plurality of processor resources (except for the one executing the distribution engine 302).

The data associated with the system 300 can be stored in a data store 332. For example, the data store 332 can store the kern& thread list 334 and a set of patch data 336, which can include a reference associated with a target function to compare to the kern& thread list. The kernel thread list 334 can represent a segment of a memory resource associated with the kernel. For example, the kernel can have multiple threads executing in parallel on a plurality of processor resources where each thread is executing an operation performed by the kernel. The data store 332 can be accessible by the modules 302, 304, and 306 to maintain data associated with the system 300.

The example system 300 can be integrated into a server device 392 or a client device 394. For example, the client device 394 can include the system 300, a multi-core processor, and a kernel to be patched using the system 300. The system 300 can be distributed across server devices 392, client devices 394, or a combination of server devices 392 and client devices 394. For example, an administrator, via a client device 394, can trigger the dynamic patching operation on server devices 392 that upon receiving this external trigger from the client device 394 can internally trigger the distribution engine 302 and the handler engine 304 on each server device 392 to perform the operations for patching the kernel described herein. The environment 390 can include a cloud computing environment, such as cloud network 330. For example, any appropriate combination of the system 300, server devices 392, and client devices 394 can be a virtual instance and/or can reside and/or execute on a virtual shared pool of resources described as a "cloud." In such an example, the kernels of the virtual machines of the cloud can be patched using the system 300. The cloud network 330 can include any number of clouds.

In the example of FIG. 3, a client device 394 can access a server device 392. The server devices 392 represent generally any computing devices configured to respond to a network request received from the client device 394. For example, a server device 392 can be a virtual machine of the cloud network 330 providing a service and the client device 394 can be a computing device configured to access the cloud network 330 and receive and/or communicate with the service. A server device 392 can include a webserver, an application server, or a data server, for example. The client devices 394 represent generally any computing devices configured with a browser or other application to communicate such requests and receive and/or process the corresponding responses. A link 396 represents generally one or any combination of a cable, wireless, fiber optic, or remote connections via a telecommunications link, an infrared link, a radio frequency link or any other connectors of systems that provide electronic communication. The link 396 can include, at least in part, intranet, the Internet, or a combination of both. The link 396 can also include intermediate proxies, routers, switches, load balancers, and the like.

Referring to FIGS. 1-3, the engines 102 arid 104 of FIG. 1 and/or the modules 202 and 204 of FIG. 2 (represented as engines 302 and 304 of FIG. 3), as well as engine 306, can be distributed across server devices 392, client devices 394, other devices or storage mediums, or a combination thereof. For example, an instance of the handler engine 304 can be executing on each one of the processor resources of the server devices 392. The engines and/or modules can complete or assist completion of operations performed in describing another engine and/or module. For example, the handler module 304 of FIG. 3 can request and/or complete the operations and/or perform the methods of the handler module 304 as well as the distribution module 302 and the interrupt module 306. The engines and/or modules can perform the example methods described in connection with FIGS. 4-7.

Figure 4:
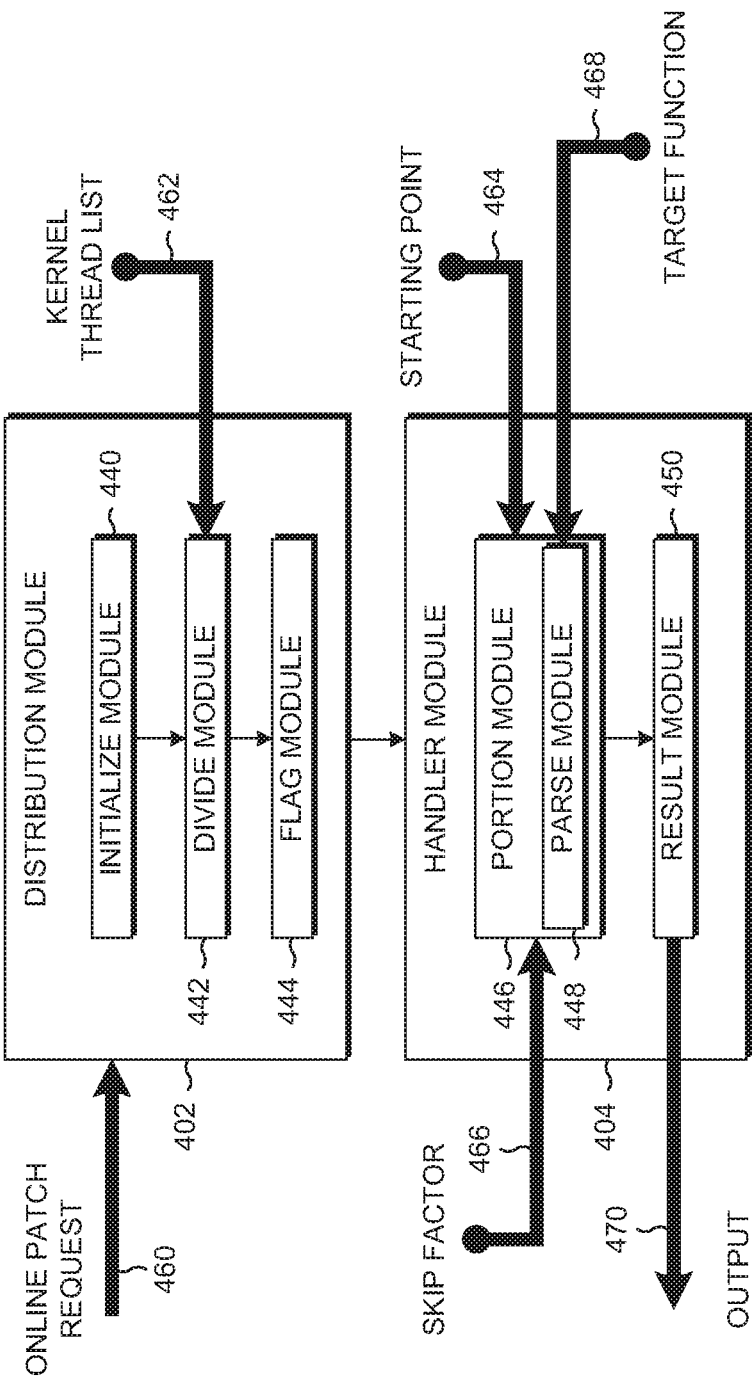
FIG. 4 depicts example modules used to implement example systems for patching a kernel.

FIG. 4 depicts example modules used to implement example systems for patching a kernel. The example modules of FIG. 4 generally include a distribution module 402 and a handler module 404, which can be the same as the distribution module 202 and handler module 204 of FIG. 2. As depicted in FIG. 4, the example modules can also include an initialize module 440, a divide module 442, a flag module 444, a portion module 446, a parse module 448, and a result module 450.

The distribution module 402 can receive an online patch request 460. The online patch request 460 can include a set of patch data. The distribution module 402 can prepare the system for patching a kernel via an initialize module 440. For example, the initialize module 440 can retrieve the kernel thread list 462, the number of active processor resources, and/or a skip factor 466, if provided. For another example, the distribution module 402 can send a halt request, such as by requesting a high priority interrupt from the interrupt engine 306 of FIG. 3, to the plurality of processor resources when the online patch request 460 and/or the set of patch data is received.

The divide module 442 can receive the kernel thread list 462 and divide the kernel thread list 462 of the present state of the system into portions. For example, the kernel thread list 462 can be divided among a number of active processor resources. The divide module 442 can determine a starting point 464 for use in traversing the portions of the kernel thread list 462. For example, the divide module 442 can use the number of processor resources to determine the number of portions of kernel thread list 462 to be distributed and calculate a starting point 464 for each portion.

The distribution module 402 can use a flag module 444 to maintain a flag. For example, a busy-wait flag can be set for the plurality of processor resources to start busy-waiting. For another example, the flag module 444 can set a start flag when the online patch request 460 is received and/or unset the flag to terminate the patching operations. In that example, the handler module 404 can continue to loop through portions of the kernel thread list 462 while the flag is set.

Once the plurality of processor resources are available to process the patch and determine if the state of the system is safe, the distribution module 402 can initiate the handler module 404 to process a portion of the kernel thread list 462. The handler module 404 can process the kernel thread list 462 on the plurality of processor resources or a handler module 404 can be distributed to each processor resource available to process the kernel thread list 462. For example, the handler module 404 can execute a portion of the kernel thread list 462 on each of the plurality of processor resources or a handler module 404 on each of the plurality of processor resources can start parsing through their respective sets of kernel threads in parallel. The handler module 404 can initiate the portion module 446 to determine the nodes of the kernel thread list 462 to process. For example, the portion module 446 can receive a starting point 464 and a skip factor 466 to calculate the nodes of the portion from the starting point 464 to a number of nodes based on the skip factor 466.

The parse module 448 represents program instructions to search the portion of the kernel thread list 462 for the target function 468. For example, the parse module 448 can compare the data of node of the kernel thread list 462 to the reference pointer of the target function 468. The parse module 448 can continue to loop through each node of the portion determined by the portion module 446. The portion module 446 can traverse the nodes of the portion and return whether a reference to the target function 468 is located at a node of the portion. The result of each comparison of nodes to the target function 468 can be returned to the results module 450. The results module 450 can receive the results of the comparisons for that portion and return a value descriptive of whether the target function 468 was referenced to in that portion of the kernel thread list 462. If the reference to the target function 468 is found, the safe state determination can stop at that point, such as by using a flag. The output 470 of the results of parsing the portion of the kernel thread list 462 can be used by the distribution module 402. For example, the result module 450 can interact with flag module 444, or otherwise maintain a stop flag to terminate the processing operations when the reference to the target function 468 is found in the kernel thread list 462. For another example, the distribution module 402 can use the output 470 to resume previous operations and determine a wait time for retrying the safe state determination.

Figure 5:
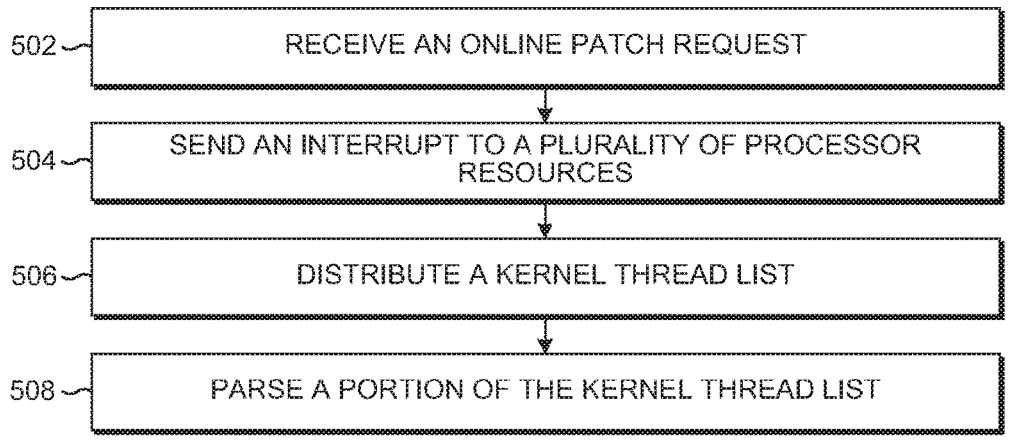
FIGS. 5-7 are flow diagrams depicting example methods for patching a kernel.
Figure 6:
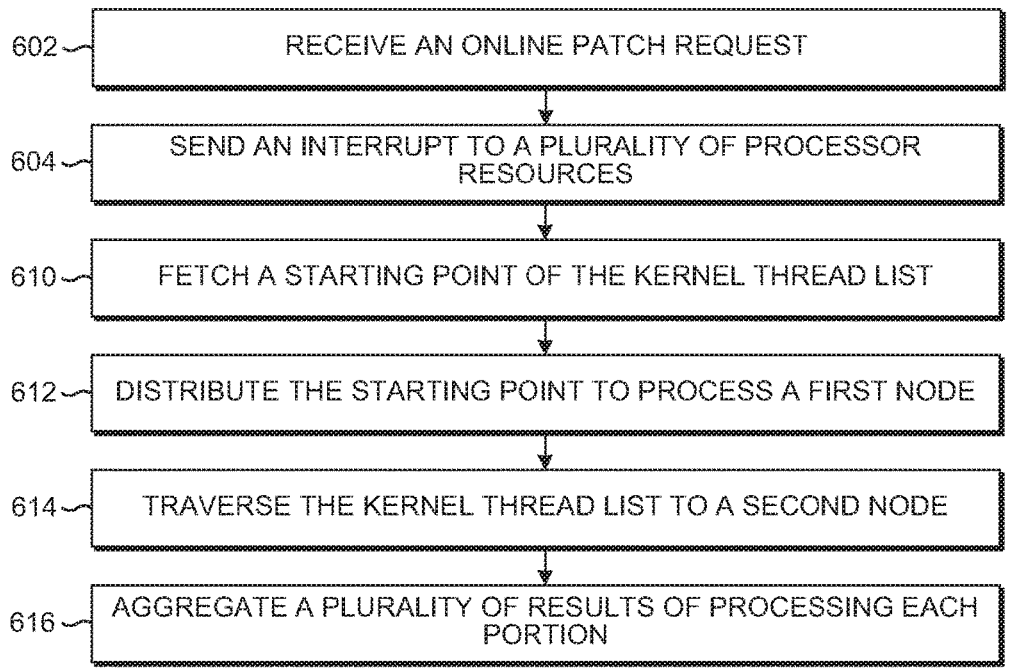
Figure 7:
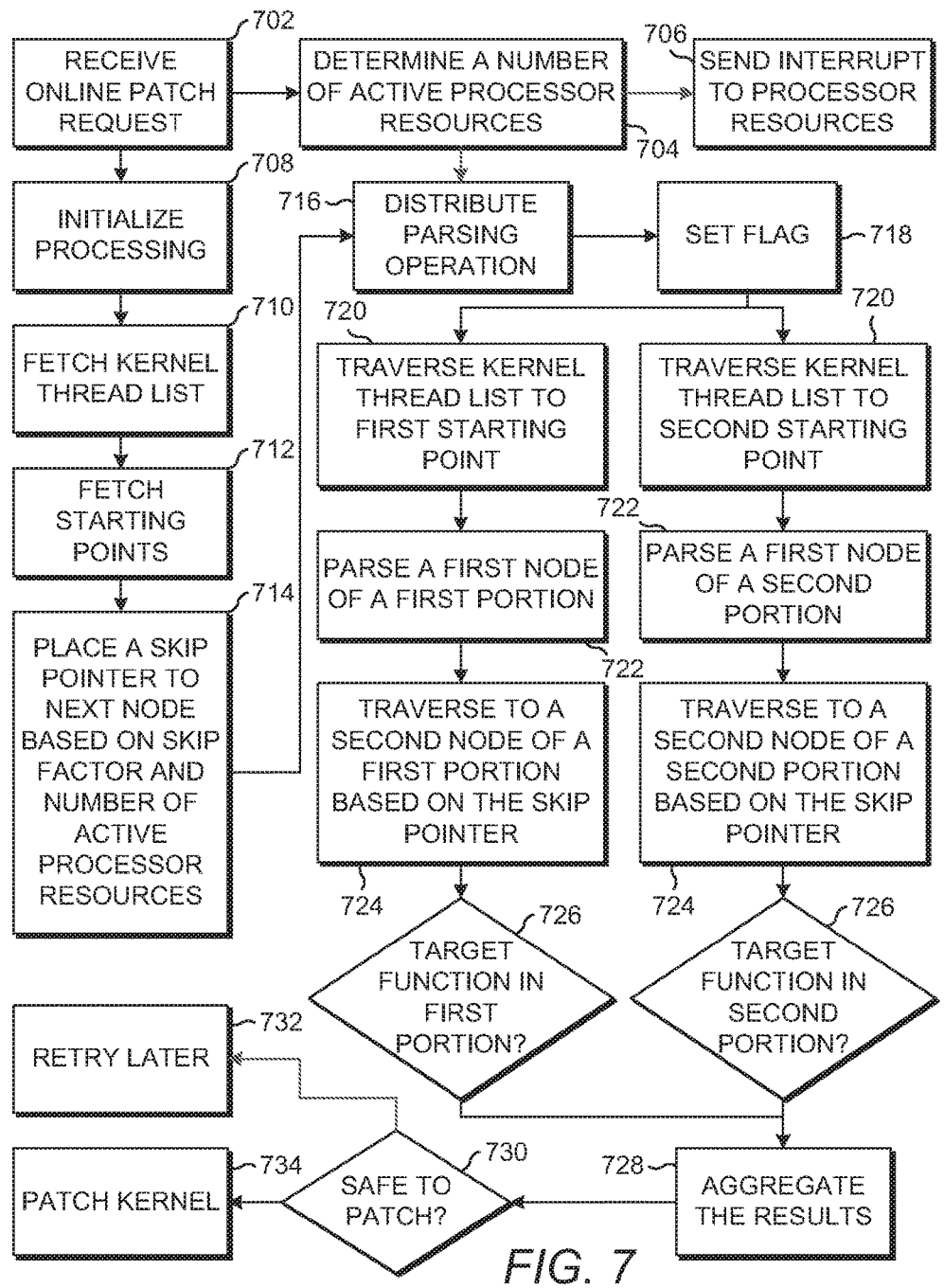

FIGS. 5-7 are flow diagrams depicting example methods for patching a kernel. Referring to FIG. 5, example methods for patching a kernel can generally comprise receiving an online patch request, sending an interrupt, distributing a kernel thread list, and parsing the kernel thread list.

At block 502, an online patch request is received. A system can receive a request to patch the kernel during operation of the kernel. To avoid problems when patching the kernel while the kernel is online, the kernel should not be executing the function to be patched. The online patch request can contain data to represent the target function. The data can be used to search the kernel thread list for reference to the target function.

At block 504, an interrupt is sent to a plurality of processor resources. The interrupt can stop the system from executing operations to free up the plurality of processor resources of the system to assist in determining whether the system is in a safe state to patch the kernel. The interrupt can be sent to all the active processor resources of the system to halt the operations on each one of the active processor resources.

At block 506, a kernel thread list is distributed to the plurality of processor resources. For example, the kernel thread list can be distributed by sending a reference or copy of the portion of the kernel thread list to a processor resource, such as a reference to a starting point node with a linked list of references to other nodes of the portion. The kernel thread list can be divided among the plurality of processor resources for processing. For example, the kernel thread list can be divided in to a plurality of portions based on a number of active processor resources. The portions can be divided in any appropriate manner. For example, the portions can be sequential in the kernel thread list or a distribution engine, such as distribution engine 102 of FIG. 1, can traverse the total number of kernel threads of the list and compile portions of the nodes of the kernel thread list for processing. The nodes of the portions can be processed to determine if a target function is in use by a kernel thread. For example, each one of the plurality of processor resources can parse a separate portion of the kernel thread list to determine when that portion is associated with a target function.

The portion of the kernel thread list can be parsed for a reference associated with the target action at block 508. For example, the target function can be associated with a memory address and the portion of the kernel thread list can be parsed to determine if there is a reference to the memory address in the portion of kernel thread list. A first portion of the kernel thread list can be parsed on one of the plurality of processor resources to determine if the portion is associated with the target function in parallel with parsing a second portion of the kernel thread list on another of the plurality of processor resources.

FIG. 6 includes blocks similar to the blocks of FIG. 5 and provides additional blocks and details. In particular, FIG. 6 depicts additional blocks and details generally regarding distributing and parsing the portion of the kernel thread list. The blocks 602 and 604 are similar to blocks 502 and 504 of FIG. 5, respectively, and, for brevity, the associated descriptions are not repeated.

At block 610, a starting point of the kernel thread list is fetched. For example, the starting point of the portion can be determined by a handler engine, such as handler engine 104 of FIG. 1, or sent to the handler engine from the distribution engine, such as distribution engine 102 of FIG. 1. The first number of nodes of the kernel thread list can be traversed to determine the starting point nodes of each portion of the kernel thread list. For example, the first number of nodes can be equal to the number of processor resources (based on the skip factor) for processing a portion on a respective processor resource. The starting point is distributed to process a first node at block 612. For example, the starting point can be a reference to the first node of a portion of the kernel thread list. Once the first node is parsed for the target function, a reference to a second node can be used. At block 614, the kernel thread list is traversed to a second node. The second node can be processed for a target function. The method can continue for any number nodes. For example, a number of nodes based on the skip factor can be processed beginning at the starting point.

At block 616, a plurality of results from processing each portion can be aggregated. For example, as each node is processed the resulting true or false value can be aggregated to determine whether the target function was found among the nodes. As the results of each portion are returned, another portion can be retrieved for processing unless a flag associated with finding a reference to the target function is set.

FIG. 7 includes blocks similar to the blocks of FIGS. 5 and 6 and provides additional blocks and details. In particular, FIG. 7 depicts additional blocks and details generally regarding initializing the parsing, placing a skip pointer, looping through nodes of the kernel thread list to find the target function, retrying the operations later when the target function is found, and patching the kernel when the kernel thread list is free of the target function. FIG. 7 depicts an example of traversing two portions of the kernel thread list in parallel; however any appropriate number of portions can process in parallel based on the plurality of processor resources. For example, if the system includes sixteen cores, sixteen portions can be processed in parallel.

At block 702, an online patch request is received. The number of active processor resources can be determined at block 704. At block 706, an interrupt can be sent to a plurality of processor resources. The interrupt can signal to stop the processor resources that are currently active and dedicate the processor resources to processing to the safe state determination.

Processing initializations can occur at block 708. In particular, the kern& thread list can be fetched at block 710, the starting points for each portion can be fetched at block 712, and a skip factor can be determined. The kernel thread list can be fetched by reference. The starting points can be determined, as discussed herein, based on the number of active processor resources to dedicate to the safe point determination. The starting points can be determined based on the skip factor. For example, the starting point can be fetched by skipping the number of active processor resources over the kernel thread list based on the skip factor. For a more specific example, the skip factor can be 124 and the first set of starting points on a quad-core processor would be node 1, node 125, node 249, and node 373. The skip factor can determine the next set of nodes to process. The skip factor can be based on the number of active processor resources and/or the number of nodes in the kernel thread list.

At block 714, a skip pointer to a next node can be placed on a node based on a skip factor and a number of active processor resources. For example, once the starting points are determined, a distribution engine, such as distribution engine 102 of FIG. 1, can distribute the starting points and the plurality of processor resources can place skip pointers using the kernel thread structures as to allow the kernel thread list to be traversed by portion based on the skip factor. A skip factor determination can allow a handler engine, such as the handler engine 104 of FIG. 1, to process, in parallel, a number of nodes equal to the skip factor in the portion assigned to each processor resource using the starting points populated at block 712. Each node of the kernel thread list can maintain a pointer to the next node of the kernel thread list and a pointer to a node that is a number of nodes of the kernel thread list equal to the skip factor. For example, a skip pointer can be maintained on a first node to a second node where the second node is a number of nodes equal to the skip factor from the first node.

At block 716, the parsing operation can be distributed to the plurality of processor resources. For example, data associated with the starting points can be sent to their respective processor resource. A flag can be set at block 718 to signal the plurality of processor resources to process their respective portions in parallel. At block 720, the kernel thread list can be traversed to the starting point. At block 722, the first node of the portions can be parsed for a reference associated with the target function. At block 724, the kernel thread list can be traversed to a second node of the portions based on the skip pointer. The portion of the kernel thread list can continue to be traversed based on example blocks 722 and 724 to complete processing of the kernel thread list. For example, the processing loop exemplified by blocks 722 and 724 can continue until the end of the portion is reached, a number of nodes equal to the skip factor are reached, or until a reference to the target function is found. At block 726, the results of the parsing at blocks 722 can determine whether the target function is in the portions. If the results determine the target function is found, a flag can be sent to stop further processing, 11the results determine the portions are free of a reference to the target function, the processor resources can continue to traverse the kernel thread list and/or obtain another portion of the kernel thread list based on the skip factor and the last parsed node. The method can continue to traverse the kernel thread list a number of nodes based on a skip factor and the number of active processor resources. The traverse loop can continue until the end of the kernel thread list is reached or terminate once a reference to the target function is discovered. For example, the handler engine on the respective CPU can fetch the next portion's starting point by skipping the number of active processor resources (based on the skip factor) over the kernel thread list by using the first node of the most recently parsed list as an index node and repeats until the entire kernel thread list has been parsed.

At block 728, a plurality of results of processing each portion can be aggregated. The resulting aggregation can be used to determine when an instruction pointer associated with the target function is in the kernel thread list. The aggregation can be a disjunctive combination of the plurality of results, such as in the results of an OR logical operator. The aggregate result can be used to determine whether it is safe to apply the patch to the system at block 730. If the aggregate result represents that the target function is associated with a kern& thread, the system can retry determining the safe point at a later time at block 732. For example, the system can return to executing the previous functions and wait a time period to try again. Trying to patch at a later time can allow for an updated kernel thread list to be retrieved and allow for the target function to complete execution. If the aggregate result described the kernel thread list to be free of the target function and the system is operating in a safe state to patch, the kernel can be patched safely at block 734.

Although the flow diagrams of FIGS. 4-7 illustrate specific orders of execution, the order of execution can differ from that which is illustrated. For example, the order of execution of the blocks can be scrambled relative to the order shown. Also, the blocks shown in succession can be executed concurrently or with partial concurrence. All such variations are within the scope of the present invention.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based only on the stimulus or a combination of stimuli including the stimulus.

The present description has been shown and described with reference to the foregoing examples. It is understood, however, that other forms, details, and examples can be made without departing from the spirit and scope of the invention that is defined in the following claims.

What is claimed is:

1. A method for patching a kernel comprising:
receiving an online patch request;
sending an interrupt to a plurality of hardware processor resources;
distributing a kernel thread list to the plurality of hardware processor resources;
dividing the kernel thread list into a plurality of portions based on a number of active processor resources;
parsing a portion of the kernel thread list on one of the plurality of hardware processor resources to determine when the portion is associated with a target function based on an instruction pointer of the target function;
determining a skip factor and a starting point based on the plurality of hardware processor resources;
traversing the kernel thread list a number of nodes based on the skip factor and the number of active processor resources;
processing a number of nodes equal to the skip factor beginning at the starting point; and
skipping the number of plurality of hardware processor resources over the kernel thread list based on the skip factor and a last processed node.

2. The method of claim 1, comprising:
fetching the starting point by skipping the number of active processor resources times over the kernel thread list based on the skip factor and the last parsed node; and
maintaining a skip pointer on a first node to a second node, the second node to be a number of nodes equal to a skip factor from the first node.

3. The method of claim 1, comprising:
aggregating a plurality of results of processing each portion to determine when an instruction pointer associated with the target function is in the kernel thread list, the kernel thread list to represent a segment of a memory resource associated with the kernel; and
waiting a time period to retrieve an updated kernel thread list.

4. The method of claim 1, further comprising: patching the kernel when the kernel thread list is free of the target function.

5. A system for patching a kernel comprising:
a plurality of hardware processor resources;
a distribution engine to divide a kernel thread list into a number of portions, the portions to be distributed among the plurality of hardware processor resources; and
a handler engine to manage processing a portion of the kernel thread list to determine when a target function is associated with the portion of the kernel thread list,
wherein the distribution engine is further to:
set a flag to trigger processing by the handler engine and determine a skip factor and a starting point based on the plurality of hardware processor resources,
wherein the handler engine is further to:
determine when an instruction pointer of the target function is in the portion of the kernel thread list;

process the portion of the kernel thread list at the starting point;

process a number of nodes of the kernel thread list from the starting point, the number of nodes based on the skip factor; and skip the number of the plurality of hardware processor resources over the kernel thread list based on the skip factor and a last processed node.

6. The system of claim 5, comprising:

an interrupt engine to send a priority interrupt to the plurality of hardware processor resources, wherein:

the distribution engine is to halt operations of the plurality of hardware processor resources via the interrupt engine when a set of patch data is received; and the handler engine is to:

process the number of portions in parallel to determine when the kernel thread list is free of the target function; and return a set of results to the distribution engine.

7. The system of claim 5, wherein the kernel is patched based on a determination that the kernel thread list is free of association of the target function.

8. A non-transitory machine readable storage medium comprising a set of instructions executable by a hardware processor resource to:

divide a kernel thread list of a kernel into a number of portions, the portions to be distributed among a plurality of processor resources;

manage processing a portion of the kernel thread list to determine when a target function is associated with the portion of the kernel thread list;

set a flag to trigger processing and determine a skip factor and a starting point based on the plurality of processor resources;

determine when an instruction pointer of the target function is in the portion of the kernel thread list;

process the portion of the kernel thread list at the starting point;

process a number of nodes of the kernel thread list from the starting point, the number of nodes based on the skip factor; and skip the number of the plurality of processor resources over the kernel thread list based on the skip factor and a last processed node.

9. The medium of claim 8, wherein the set of instructions is to:

send a priority interrupt to the plurality of processor resources; and halt operations of the plurality of processor resources when a set of patch data is received.

10. The medium of claim 9, wherein the set of instructions is to:

process the number of portions in parallel to determine when the kernel thread list is free of the target function; and initiate patching of the kernel once the list is free of the target function.

* * * * *